(No Model.)

C. W. TEED.
FISH HOOK GUARD.

No. 404,747. Patented June 4, 1889.

WITNESSES
Villette Anderson,
Mary Boykin.

INVENTOR
Charles W. Teed.
by E. W. Anderson
his Attorney

UNITED STATES PATENT OFFICE.

CHARLES W. TEED, OF ELMIRA, NEW YORK.

FISH-HOOK GUARD.

SPECIFICATION forming part of Letters Patent No. 404,747, dated June 4, 1889.

Application filed October 16, 1888. Serial No. 288,199. (No model.)

*To all whom it may concern:*

Be it known that I, CHARLES W. TEED, a citizen of the United States, and a resident of Elmira, in the county of Chemung and State of New York, have invented certain new and useful Improvements in Fish-Hook Guards; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 2:
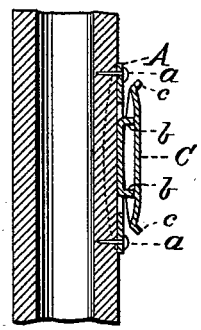
Figure 1:
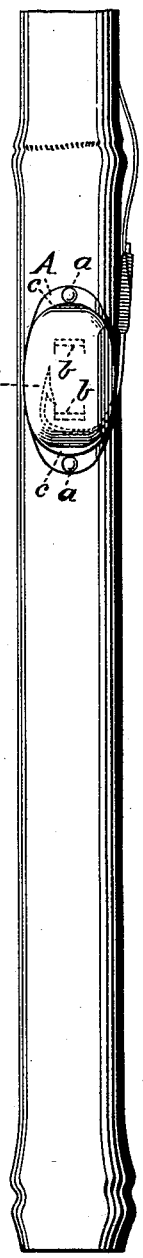
Figure 3:
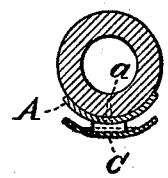

Figure 1 of the drawings is a representation of this invention, and is a front view. Fig. 2 is a longitudinal section. Fig. 3 is a cross-section.

This invention has relation to improvements in shields for fish-hooks; and it consists, essentially, of two plates or disks suitably connected together and designed to be secured to a fishing-rod, the object being to provide a shield that will securely hold and protect the hook.

Referring to the drawings, A designates a metal plate concave in cross-section to conform to the shape of the rod B, to which it is attached by small tacks, as at $a$, or otherwise, and having short posts $b$ formed integral therewith, to which is secured the top plate C, which is preferably of metal having a slight elasticity or spring, so that a slight force is required to place the shank of the hook between the lateral edges of the two plates when the hook portion is engaged around the short post $b$ nearest the butt of the rod. The ends of the upper plate C may have a slight upward turn, as at $c$, to guide the hook between the plates.

It will be observed that when the hook is within the shield its point is entirely covered and protected, and the spring of the top plate will hold the hook securely in place.

Having described my invention, what I claim is—

1. A fish-hook shield consisting of a concave attachment-plate adapted to be secured to the rod, and having connected thereto a spring top plate C, forming a shield, substantially as specified.

2. The combination, with a fishing-rod, of a hook-shield consisting of the lower plate secured to the rod, and having the integral posts, and the top plate of spring metal adapted to hold the hook between its lateral edge and the lateral edge of the lower plate, substantially as specified.

In testimony whereof I affix my signature in presence of two witnesses.

CHARLES W. TEED.

Witnesses:
CHAS. A. AUSTIN,
F. M. BROWN.